US011374636B2

(12) United States Patent
Lai et al.

(10) Patent No.: US 11,374,636 B2
(45) Date of Patent: Jun. 28, 2022

(54) SYSTEM AND METHOD FOR NULLFORMING WITH ANTI-JAM ANTENNA ELECTRONICS

(71) Applicant: Rockwell Collins, Inc., Cedar Rapids, IA (US)

(72) Inventors: Ying Cho Lai, Hiawatha, IA (US); Jeffrey B. Bishop, Solon, IA (US); Brian J. Herting, Cedar Rpaids, IA (US); Michael H. Stockmaster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 388 days.

(21) Appl. No.: 16/737,116

(22) Filed: Jan. 8, 2020

(65) Prior Publication Data

US 2021/0211170 A1 Jul. 8, 2021

(51) Int. Cl.
| H04B 7/06 | (2006.01) |
| H01Q 3/26 | (2006.01) |
| H04B 7/08 | (2006.01) |

(52) U.S. Cl.
CPC ......... *H04B 7/0617* (2013.01); *H01Q 3/2617* (2013.01); *H04B 7/086* (2013.01)

(58) Field of Classification Search
CPC .... H04B 7/0617; H04B 7/086; H04B 1/7073; H01Q 3/2617; H04W 64/006; H04W 64/003
See application file for complete search history.

(56) References Cited

U.S. PATENT DOCUMENTS

| 5,371,506 A | 12/1994 | Yu et al. |
| 5,955,987 A | 9/1999 | Murphy et al. |

(Continued)

FOREIGN PATENT DOCUMENTS

| WO | 9824192 A1 | 6/1998 |
| WO | 2019142198 A1 | 7/2019 |

OTHER PUBLICATIONS

Extended Search Report for European Application No. 21150763.7 dated Mar. 16, 2021, 8 pages.

*Primary Examiner* — Iqbal Zaidi
(74) *Attorney, Agent, or Firm* — Suiter Swantz pc llo (57) ABSTRACT

An antenna system may include an antenna array configured to receive one or more signals. In embodiments, the antenna system further includes one or more signal processors configured to: determine a beamforming weight vector ($W_{bf}$) for the antenna array; determine a first seeding weight vector ($W_{seed1}$) for the antenna array, wherein the first seeding weight vector ($W_{seed1}$) comprises a first nulling weight vector ($W_{null}$) or a second beamforming weight vector ($W_{bf}$); determine a first nullforming adjustment factor ($\eta_1$) for the antenna array; calculate a first nullforming weight vector ($W_{nf1}$) based on at least the beamforming weight vector ($W_{bf}$), the first seeding weight vector ($W_{seed1}$) and the first nullforming adjustment factor ($\eta_1$); and form a first antenna pattern based on the first nullforming weight vector ($W_{nf1}$) to generate a first antenna electronics (AE) output signal, wherein the first antenna pattern generates a first set of one or more nulls.

14 Claims, 3 Drawing Sheets

(56) References Cited

U.S. PATENT DOCUMENTS

| | | | |
|---|---|---|---|
| 8,704,728 | B2 | 4/2014 | Mujahed et al. |
| 9,612,342 | B2 | 4/2017 | Petersen |
| 10,327,221 | B1* | 6/2019 | Sarrigeorgidis .... H04L 25/0204 |
| 2014/0057638 | A1* | 2/2014 | Carey .................. H04W 16/18 |
| | | | 455/446 |
| 2015/0346345 | A1 | 12/2015 | Bartone |
| 2018/0288627 | A1 | 10/2018 | Ellum et al. |
| 2022/0094401 | A1* | 3/2022 | Raghavan ............ H04B 7/0695 |

* cited by examiner

SYSTEM AND METHOD FOR NULLFORMING WITH ANTI-JAM ANTENNA ELECTRONICS

BACKGROUND

Modern antennas often include active electronically scanned arrays (AESAs) including a plurality of antenna elements. The use of antenna arrays (e.g., AESAs), in conjunction with digital processing techniques, allows for modern antennas to mitigate effects of jamming signals, and improve antenna performance. Anti-jamming (AJ) signal processing is a jammer nulling technique that can be done in time domain or frequency domain. Two traditional modes of operation in anti-jamming antenna electronics (AJAE) are the nulling mode which minimizes jamming signal power according to certain criterion of optimality, and the beamforming mode which constrains the AJ processing to maintain a specified gain in the direction of signal of interest while minimizing jamming signal power. However, traditional nulling technique is an adaptive approach that only depends on signal conditions, and therefore is lacking the flexibility to perform any additional nulling if needed. This disclosure provides a new technique in AJ processing to create a null (nullforming) in the user-specified direction while maintaining its AJ capability. Therefore, the nullforming technique in this disclosure is a generalized nulling approach that simultaneously performs adaptive nulling which depends on signal conditions, and constrained nulling which gives user the option to create a null in a specified direction regardless of signal conditions.

SUMMARY

An antenna system is disclosed. In embodiments, the antenna system includes an antenna array including two or more antenna elements, wherein the antenna array configured to receive one or more signals. In embodiments, the antenna system further includes one or more signal processors configured to: determine a beamforming weight vector ($W_{bf}$) for the antenna array; determine a first seeding weight vector ($W_{seed1}$) for the antenna array, wherein the first seeding weight vector ($W_{seed1}$) comprises at least one of a first nulling weight vector ($W_{null1}$) or a second beamforming weight vector ($W_{bf2}$) different from the beamforming weight vector ($W_{bf}$); determine a first nullforming adjustment factor ($\eta_1$) for the antenna array; calculate a first nullforming weight vector ($W_{nf1}$) based on at least the beamforming weight vector ($W_{bf}$), the first seeding weight vector ($W_{seed1}$), and the first nullforming adjustment factor ($\eta_1$); and form a first antenna pattern based on the first nullforming weight vector ($W_{nf1}$) to generate a first antenna electronics (AE) output signal, wherein the first antenna pattern generates a first set of one or more nulls.

In some embodiments of the antenna system, the first set of one or more nulls include one or more constrained nulls generated in a specified direction.

In some embodiments of the antenna system, the first set of one or more nulls include one or more adaptive nulls generated in a direction of one or more received jamming signals.

In some embodiments of the antenna system, the first set of one or more nulls further include one or more sympathetic nulls generated in one or more directions other than the direction of the one or more received jamming signals.

In some embodiments of the antenna system, the first nullforming adjustment factor ($\eta_1$) is determined based on at least one of the beamforming weight vector ($W_{bf}$) or the first seeding weight vector.

In some embodiments of the antenna system, the one or more signal processors include one or more digital signal processors.

In some embodiments of the antenna system, the first nullforming weight vector ($W_{nf1}$) is defined as $W_{nf1}=W_{seed1}-\eta_1 W_{bf}$.

In some embodiments of the antenna system, the antenna system further includes a receiver configured to: receive the first AE output signal; determine a gain of the first AE output signal in a determined nulling direction; and determine a nulling effectiveness metric of the first nullforming weight vector ($W_{nf1}$) based on the gain of the first AE output signal.

In some embodiments of the antenna system, the receiver is further configured to: determine one or more characteristics of the one or more signals based on the first AE output signal, wherein the one or more characteristics of the one or more signals comprise a direction of the one or more signals.

In some embodiments of the antenna system, the one or more signal processors are further configured to: determine a second seeding weight vector ($W_{seed2}$) for the antenna array; determine a second nullforming adjustment factor ($\eta_2$) for the antenna array; calculate a second nullforming weight vector ($W_{nf2}$) based on at least the beamforming weight vector ($W_{bf}$), the second seeding weight vector ($W_{seed2}$), and the second nullforming adjustment factor ($\eta_2$); and form a second antenna pattern based on the second nullforming weight vector ($W_{nf2}$) to generate a second AE output signal, wherein the second antenna pattern generates a second set of one or more nulls.

In some embodiments of the antenna system, wherein the first set of one or more nulls include a first constrained null generated in a defined direction, and the second set of one or more nulls generate a second constrained null in the defined direction.

In some embodiments of the antenna system, the first set of one or more nulls and the second set of one or more nulls are generated simultaneously.

In some embodiments of the antenna system, comprising a receiver configured to: evaluate the first AE output signal; evaluate the second AE output signal; and compare the first AE output signal and the second AE output signal to determine one or more characteristics of the one or more signals.

In some embodiments of the antenna system, the one or more characteristics of the one or more signals include a direction of the one or more signals.

In some embodiments of the antenna system, evaluating the first AE output signal includes determining a first nulling effectiveness of the first nullforming weight vector ($W_{nf1}$), and evaluating the second AE output signal includes determining a second nulling effectiveness of the second nullforming weight vector ($W_{nf2}$).

A method for nullforming is disclosed. In embodiments, the method includes: receiving one or more signals with an antenna array including one or more antenna elements; determining a beamforming weight vector ($W_{bf}$) for the antenna array; determining a seeding weight vector ($W_{seed}$) for the antenna array, wherein the seeding weight vector ($W_{seed}$) includes at least one of a nulling weight vector ($W_{nul}$) or an additional beamforming weight vector ($W_{bf2}$) different from the beamforming weight vector ($W_{bf}$); determining a nullforming adjustment factor ($\eta$) for the antenna array; calculating the nullforming weight vector ($W_{nf}$) based on at least the beamforming weight vector ($W_{bf}$), seeding weight vector ($W_{seed}$), and the nullforming adjustment factor ($\eta$); and forming an antenna pattern based on the nullforming weight vector ($W_{nf}$), wherein the antenna pattern generates a first set of one or more nulls.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Antenna array processing techniques for inserting reception pattern nulls in a specified direction or adaptively in the direction of jamming signals have been known in the art. However, the ability to insert a deep null in a specified direction while maintaining deep adaptive nulls in the direction of jamming signals has proven to be difficult to achieve. The techniques of the present disclosure address these shortfalls of previous approaches and allow for the generation of a deep null in a specified direction while maintaining the adaptive null depth in the direction of jamming signals. The techniques of the present disclosure address shortfalls caused by the sympathetic nulls in the adaptive nulling process.

Embodiments of the present disclosure are directed to an antenna electronics (AE) configured to generate one or more nulls based on a calculated nullforming weight vector ($W_{nf}$). The one or more nulls generated may include a constrained null in a specified direction and, if present, one or more adaptive nulls in the direction of jamming signals. In embodiments, the nullforming weight vector ($W_{nf}$) may be based on, at least in part, a nulling weight vector ($W_{nul}$) or a beamforming weight vector ($W_{bfn}$) for a direction other than the constrained null direction, which is considered a seeding weight vector later in the disclosure, a beamforming weight vector ($W_{bf}$) in the same direction as the constrained null, and a nullforming adjustment factor ($\eta$). Additional embodiments of the present disclosure are directed to a method for modifying the nulling weight vector ($W_{nul}$) to mitigate the presence of undesired sympathetic nulls within the nullforming reception pattern.

It is contemplated herein that embodiments of the present disclosure may enable suppression and/or elimination of jamming signals while forming a null in a user specified direction (e.g., constrained nulls). Additionally, embodiments of the present disclosure may allow for adjustable depth of constrained nulls, and for the use of multiple seeding weight vectors to create multiple nullforming instances in the same direction. By enabling the ability to create multiple nullforming instances in the same constrained null direction, the system and method of the present disclosure may allow for unintended sympathetic nulls to be avoided, and may allow for more robust nullforming and thus the improved direction-of-arrival determination for received signals.

As will be described in further detail herein, the term "instance" may be used to refer to the process of antenna electronics (AE) calculating weight vectors for an AJ mode of operation (e.g., nulling, beamforming, nullforming) based on a block of samples, and a receiver processing a signal of interest upon which the determined weight vectors are applied. Accordingly, multiple "nullforming instances" may refer to multiple iterations of the following steps: (1) AE calculating a new seeding weight vector, (2) AE computing a new nullforming weight vector based on the latest calculated seeding weight vector, and (3) a receiver determining the calculated nullforming weight vector's impact on the signal of interest.

Figure 1:
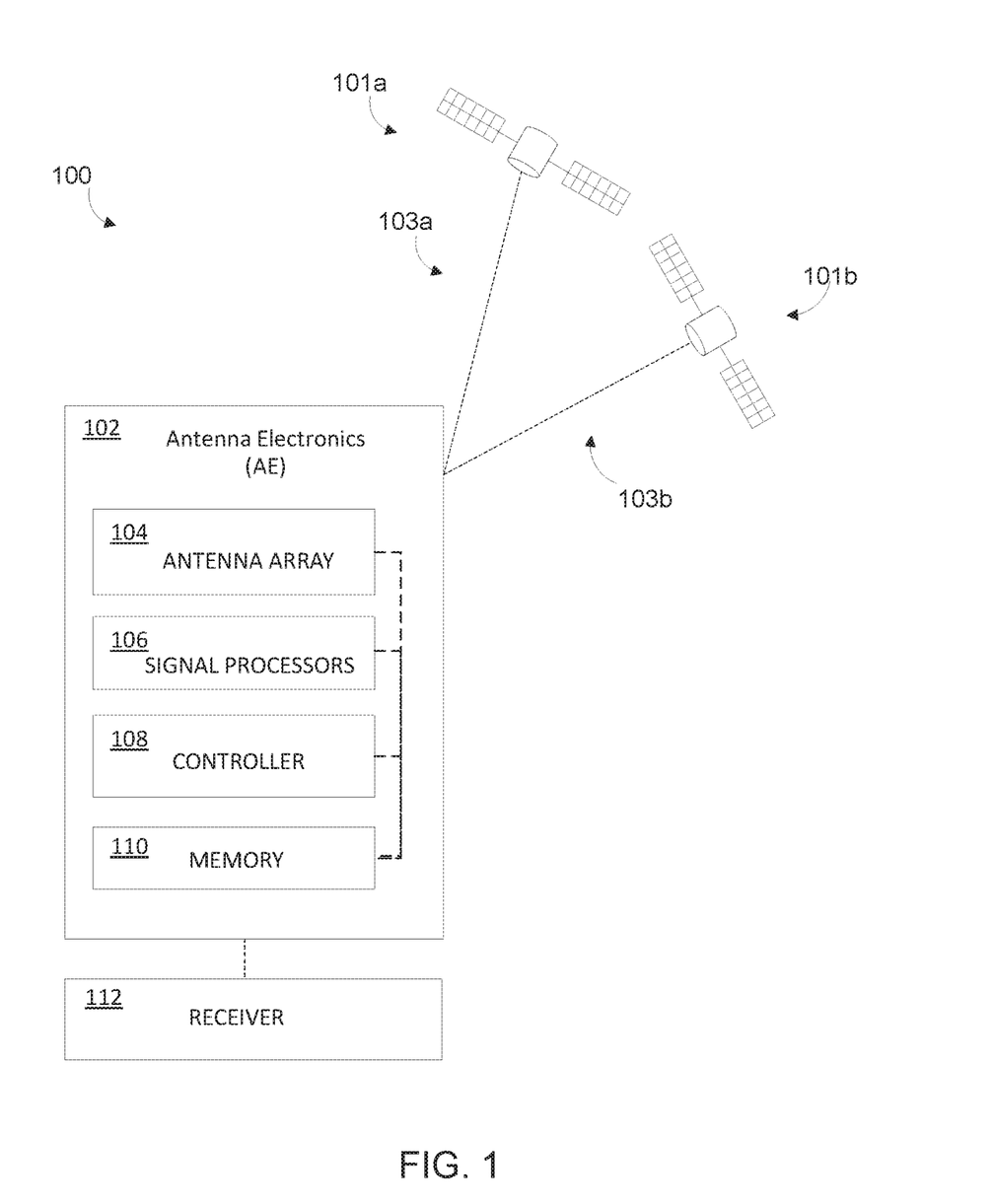
FIG. 1 illustrates an antenna system including antenna electronics (AE) for performing nullforming, in accordance with one or more embodiments of the present disclosure.

FIG. 1 illustrates an antenna system 100 including antenna electronics (AE 102) for performing nullforming, in accordance with one or more embodiments of the present disclosure. The antenna system 100 may include, but is not limited to, AE 102 configured to perform anti-jam (AJ) nullforming functions.

In embodiments, the AE 102 of the antenna system 100 may include, but is not limited to, an antenna array 104, one or more signal processors 106, a controller 108, and a memory 110. The antenna system 100 may further include a receiver 112 configured to perform signal processing of the output of the AE 102. In this regard, the receiver 112 may be configured for processing signals of interest after AJ operation by the AE 102, and may therefore be regarded as an instrument for AJ performance assessment.

In embodiments, antenna array 104 may include a plurality of antenna elements. The plurality of antenna elements may be arranged in any manner known in the art. For example, the antenna array 102 may include at least two antenna elements regardless of its geometry. It is assumed hereafter that the antenna array has a total of M elements. In embodiments, the plurality of antenna elements of the antenna array 104 are configured to receive one or more signals 103a, 103b from one or more transmitting devices 101a, 101b. For example, as shown in FIG. 1, the antenna array 104 may be configured to receive a first signal 103a from a first transmitting device 101a, and a second signal 103b from a second transmitting device 101b. The antenna array 104 may be configured to receive any number of signals 103a-103n from any number of transmitting devices 101a-101n. Depending upon the position of the AE 102 to each of the transmitting devices 101a, 101b, the signals 103a, 103b may be received from varying directions. For instance, as shown in FIG. 1, the first signal 103a may be received from a first direction, and the second signal 103b may be received from a second direction different from the first direction. It is contemplated herein that the directions from which signals 103a, 103b are received may be determined according to any frame of reference known in the art including, but not limited to, boresight.

It is noted herein that the transmitting devices 101a, 101b may include any transmitting device known in the art including, but not limited to, jamming devices, satellites, radios, beacons, and the like. For example, the second transmitting device 101b may include a jamming device, such that the signals 103b received from the jamming device (e.g., second transmitting device 101b) may be regarded as jamming signals 103b. As noted previously herein, embodiments of the present disclosure are directed to the AE 102 and a method for operating the AE 102 configured to suppress, or eliminate, the effects of jamming signals.

The antenna array 104 may be communicatively coupled to the one or more signal processors 106, the controller 108, and the memory 110. In embodiments, AE 102 may be configured to receive the one or more signals 103a, 103b and perform one or more analog-to-digital conversion (ADC) operations on the received analog signals in order to generate digital signals. In this regard, the AE 102 (e.g., antenna array 104, signal processors 106, controller 108) may include one or more ADC devices.

In embodiments, the one or more signal processors 106 (e.g., digital signal processors 106) may receive the signals 103a, 103b (e.g., digitized signals 103a, 103b) from the antenna array 104. The one or more signal processors 106 may be configured to execute a set of program instructions stored in memory 110, the set of program instructions configured to cause the one or more signal processors 106 to carry out the various steps of the present disclosure. It is contemplated herein that the one or more signal processors 106 and controller 108 may include processing and/or logic components configured to carry out the various functions of the AE 102. It is further contemplated herein that the one or more signal processors 106 may include separate hardware/components from the controller 108, or may include a module executable by the controller 108. However, for the purposes of the present disclosure, the one or more signal processors 106 will be shown and described as separate components which are configured to carry out a majority of the steps/functions of the present disclosure. In this regard, the controller 108 may be understood to include processing functionality for the AE 102 which utilizes the output of the signal processors 106, and which communicatively couples the components of the AE 102 to additional and/or alternative electronic components.

For example, the one or more signal processors 106 (e.g., digital signal processors 106) may be configured to: determine a beamforming weight vector ($W_{bf}$) for the antenna array; determine a nulling weight vector ($W_{nul}$) for the antenna array; determine the nullforming adjustment factor ($\eta$) for the antenna array; calculate a nullforming weight vector ($W_{nf}$) based on at least the beamforming weight vector ($W_{bf}$), the nulling weight vector ($W_{nul}$), and the nullforming adjustment factor ($\eta$). Each of these steps/functions may be further understood with reference to FIGS. 2A-2B.

Figure 2A:
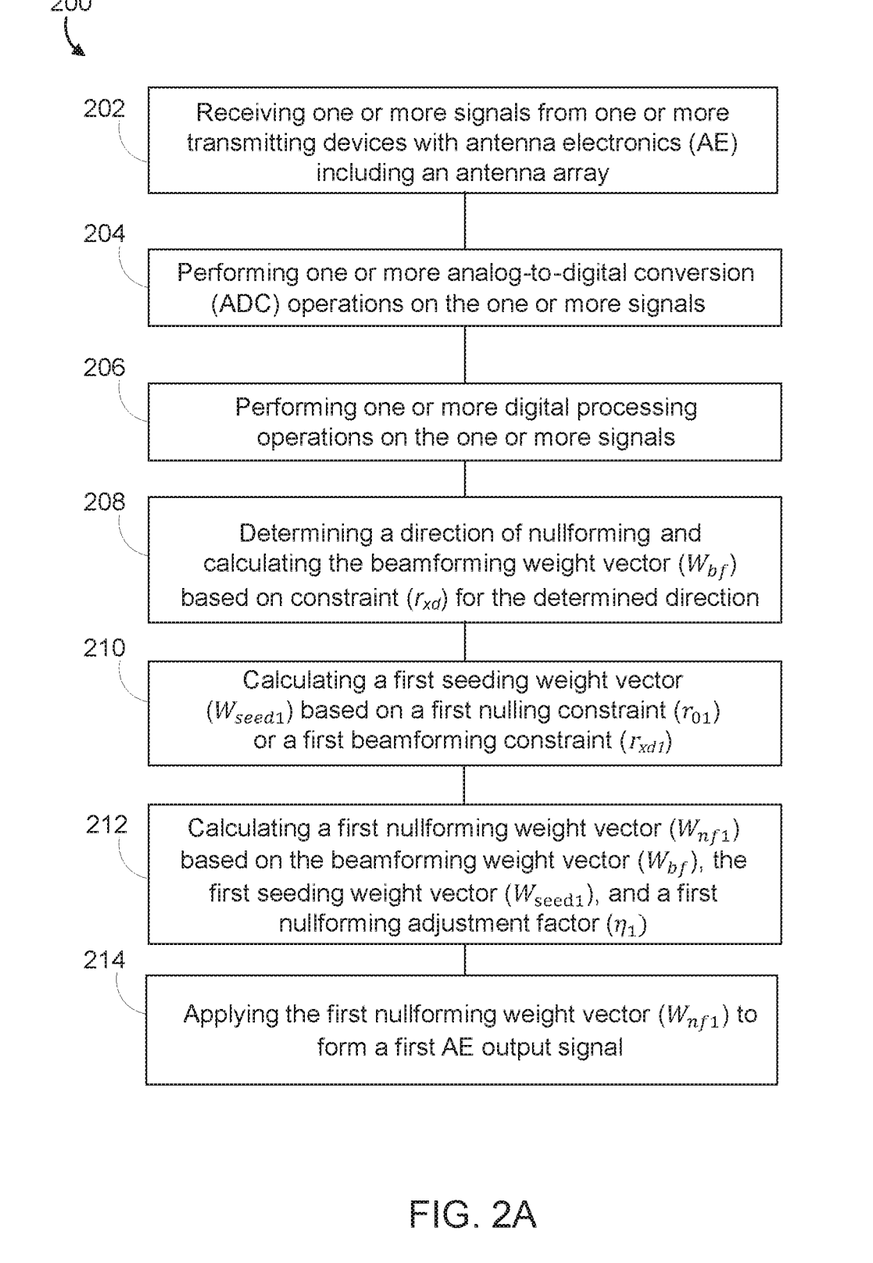
FIG. 2A illustrates a portion of a method for nullforming with antenna electronics (AE) of an antenna system, in accordance with one or more embodiments of the present disclosure.
Figure 2B:
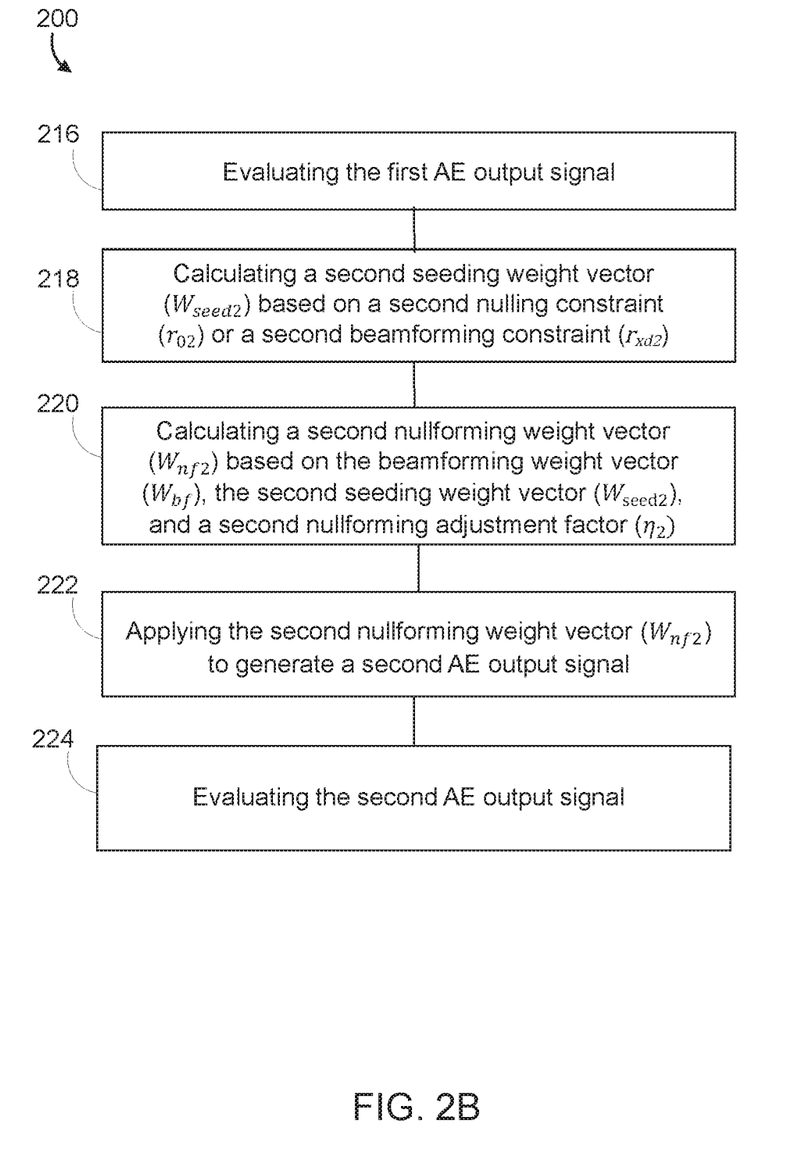
FIG. 2B illustrates a portion of a method for nullforming with antenna electronics (AE) of an antenna system, in accordance with one or more embodiments of the present disclosure.

FIGS. 2A-2B illustrate portions of a method 200 for nullforming with the antenna electronics (AE) 102, in accordance with one or more embodiments of the present disclosure. It is noted herein that the steps of method 200 may be implemented all or in part by the antenna system 100/AE 102. It is further recognized, however, that the method 200 is not limited to the antenna system 100/AE 102 in that additional or alternative system-level embodiments may carry out all or part of the steps of method 200.

In a step 202, one or more signals 103 are received. For example, as shown in FIG. 1, the antenna array 104 of the AE 102 may receive one or more signals 103 from one or more transmitting devices 101. Signals 103 received by the antenna array 104 may include desired/legitimate signals intended to be received by the receiver 112, as well as undesired jamming signals 103. In this regard, the antenna array 104 may receive one or more jamming signals 103 from one or more jamming devices.

In a step 204, one or more analog-to-digital conversion (ADC) operations are performed on the composite of received signals 103 passing through each antenna element of the antenna array 104 and associated radio-frequency (RF) channel electronics. In this regard, the AE 102, antenna array 104, and/or signal processors 106 may include one or more ADC devices configured to perform ADC operations on the received signals 103.

In a step 206, one or more digital processing operations are performed. It is noted herein that baseline processing (e.g., digital processing operations) may be performed by the signal processors 106 prior to AJ weight vector calculations. The one or more digital processing operations (baseline processing) may include any digital processing operations known in the art. For example, the one or more digital processing operations may include processing ADC samples in either time or frequency domains, and estimation of the M-by-M covariance matrix (or matrices) accordingly, where M is the number of antenna elements within the antenna array 104.

In a step 208, a direction for desired nullforming is determined (e.g., constrained direction), and a beamforming weight vector ($W_{bf}$) for the determined/constrained direction is determined. In embodiments, the), the beamforming weight vector ($W_{bf}$) for the determined/constrained direction is determined based on a beamforming constraint for the specified nullforming direction ($\tau_{xd}$) (e.g., determined/constrained direction), In embodiments, the one or more signal processors 106 may be configured to identify a direction of received jamming signals 103, and identify the direction of the jamming signals as the determined/constrained direction for nullforming. In additional and/or alternative embodiments, the signal processors 106 may be configured calculate the beamforming weight vector ($W_{bf}$) for the antenna array 104 for a specified direction commanded by the receiver 112. The beamforming weight vector ($W_{bf}$) may be managed by controller 108 and stored in memory 110.

In a step 210, a first seeding weight vector ($W_{seed1}$) is calculated based on a first nulling constraint ($\tau_{o1}$) or a first beamforming constraint ($\tau_{xd1}$). In embodiments, the first seeding weight vector ($W_{seed1}$) may include a first nulling weight vector ($W_{null1}$) or a beamforming weight vector ($W_{bf1}$) for a direction other than the nullforming direction, as shown in Equation 1:

$$W_{seed1} = W_{null1} \text{ or } W_{bf1} \qquad (1)$$

In embodiments where the first seeding weight vector ($W_{seed1}$) includes a first nulling weight vector ($W_{null1}$) the first seeding weight vector ($W_{seed1}$) includes a non-directional weight vector. Conversely, in embodiments where the first seeding weight vector ($W_{seed1}$) includes a beamforming weight vector ($W_{bf1}$), the first seeding weight vector ($W_{seed1}$) includes a directional weight vector. Furthermore, in embodiments where the first seeding weight vector ($W_{seed1}$) includes a beamforming weight vector ($W_{bf1}$), the directional seeding weight vector ($W_{seed1}$) must be for a direction other than the determined/constrained direction for nullforming.

The nulling constraint ($\tau_{o1}$) may include a column vector of M zeros with one value of the column vector being set to 1, where M is the number of antenna elements. For example, if $r_{o1} = [1\ 0\ \ldots\ 0]^T$, a different seeding weight vector ($W_{seed1}$) (e.g., first nulling weight vector ($W_{null2}$)) may be calculated by using a different constraint such as $r_{o2} = [0\ 1\ \ldots\ 0]^T$. The seeding weight vector ($W_{seed1}$) may be managed by controller 108 and stored in memory 110.

In a step 212, a first nullforming weight vector ($W_{nf1}$) is determined. In embodiments, a nullforming weight vector ($W_{nf}$) may be calculated based on a beamforming weight vector ($W_{bf}$), the seeding weight vector ($W_{seed1}$) (e.g., first nulling weight vector ($W_{null1}$), or first beamforming weight vector ($W_{bf1}$)), and a nullforming adjustment factor ($\eta_1$). In this regard, the one or more signal processors 106 may be configured to determine the first nullforming adjustment factor ($\eta_1$) for the antenna array 104. In embodiments, a nullforming adjustment factor ($\eta_1$) may be determined/chosen based on the beamforming weight vector ($W_{bf}$) and the first seeding weight vector ($W_{seed1}$).

For example, the signal processors 106 may be configured to calculate the first nullforming weight vector ($W_{nf1}$) based on (1) the beamforming weight vector ($W_{bf}$), (2) the first nullforming adjustment factor ($\eta_1$), and (3) the first seeding weight vector ($W_{seed1}$) (e.g., first nulling weight vector ($W_{null1}$), or first beamforming weight vector ($W_{bf1}$)), as shown in Equation 2:

$$W_{nf1} = W_{seed1} - \eta_1 W_{bf} \qquad (2)$$

wherein the first nullforming adjustment factor $\eta_1$ is a single complex value which depends on the beamforming constraint for the specified nullforming direction ($\tau_{xd}$).

In a step 214, the first nullforming weight vector ($W_{nf1}$) is applied to form a first AE output signal. For example, the one or more signal processors 106 generate one or more control signals configured to apply the first nullforming weight vector ($W_{nf1}$) to the digitized output of the antenna array 104 in order to generate a first antenna pattern. In this regard, the signal processors 106 may be configured to form a first antenna pattern based on the first nullforming weight vector ($W_{nf1}$). The first antenna pattern may subsequently be used to modify the digitized signals of the antenna array 104 and generate the first AE output signal. For the purposes of the present disclosure, the term "AE output signal" may be regarded as the digitized signals from the antenna array 104 modified by the respective nullforming weight vector ($W_{nf1}$)/antenna pattern. In this regard, the first AE output signal may be regarded as the digitized signals from the antenna array 104 modified by the first antenna pattern, which was generated by the first nullforming weight vector ($W_{nf1}$).

In embodiments, the first antenna pattern generated by the first nullforming weight vector ($W_{nf1}$) may generate a first set of one or more nulls. The first set of one or more nulls may include one or more constrained nulls generated in a specified direction other than the direction of received jamming signals 103 (e.g., direction of nullforming determined in step 208). In general, each nullforming weight vector ($W_{nf1}$) may be configured to generate one constrained null in the specified direction. It is further noted herein that the first set of one or more nulls may further include one or more adaptive nulls generated in a direction of received jamming signals 103 (if jamming signals 103 are present). Furthermore, the first set of one or more nulls may further include one or more sympathetic nulls generated in one or more directions other than the direction of the one or more received jamming signals 103 and/or the direction of the generated constrained nulls.

In a step 216, the receiver 112 may be configured to evaluate/process the AE output signal. In this regard, the receiver 112 may be configured to evaluate the first AE output signal (e.g., digitized signals as modified by the first nullforming weight vector (($W_{nf1}$)/first antenna pattern). By evaluating the AE output signal, the receiver 112 may be configured to determine one or more characteristics of the received signals 103a, 103b, the first set of nulls, and the like. Characteristics which may be determined may include, but are not limited to, signal power, signal direction estimation (e.g., signal direction relative to boresight), and the like. It is noted herein that evaluating AE output signals may include evaluating power, gain, and phase of the received signals 103a, 103b as modified by the first nullforming weight vector ($W_{nf1}$).

By way of example, the receiver 112 may be configured to receive the first AE output signal (e.g., digitized signals of antenna array 104 modified by the first nullforming weight vector (($W_{nf1}$)/first antenna pattern), and determine a gain/power of the first AE output signal in the determined nulling direction. The receiver 112 may then be configured to determine a nulling effectiveness metric of the first nullforming weight vector ($W_{nf1}$) based on the determined gain/power of the first AE output signal. A nulling metric may include any metric indicative of an effectiveness of the one or more constrained nulls of the first set of one or more nulls of the first antenna pattern (e.g., first nullforming weight vector ($W_{nf1}$)) in suppressing and/or eliminating the intended signal 103b. In embodiments, higher nulling metrics may be indicative of higher nulling effectiveness/performance (e.g., high effectiveness in suppressing the intended signal 103b, "deeper" null), whereas lower nulling metrics may be indicative of lower nulling effectiveness/performance (e.g., low effectiveness in suppressing the intended signal 103b, "shallower" null).

It is noted herein that the effectiveness/efficiency of a nullforming weight vector ($W_{nf}$) may be determined by comparing the gain/power of signals 103 intended to be nulled to signal power threshold values. For example, the first nullforming weight vector ($W_{nf}$) may be generated and applied in an effort to null jamming signals 103 coming from a determined/constrained direction. After applying the first nullforming weight vector ($W_{nf1}$), the receiver 112 may receive the AE output signal, determine the resulting gain/power of the intended signal 103. Accordingly, the signal power and/or detectability of signals 103 by the receiver 112 after the application of nullforming weight vectors ($W_{nf}$) may be used as a performance indicator of the nullforming processing.

Furthermore, the efficiency of a particular nullforming weight vector ($W_{nf}$) (e.g., nulling efficiency metric) may be used to determine one or more characteristics of a signal 103. For example, by comparing signal powers of received signals 103 before and after the application of a nullforming weight vector ($W_{nf}$), the signal processors 106 and/or receiver 112 may be configured to determine a direction/angle of arrival of the received signals 103.

In some embodiments, if the first nullforming weight vector ($W_{nf1}$) is found to be effective (e.g., sufficiently nulls identified jamming signals 103), the method 200 may terminate at step 216. In additional and/or alternative embodiments, the method 200 may proceed to in order to generate additional nullforming weight vectors ($W_{nf}$). For example, if it is determined that the first nullforming weight vector ($W_{nf1}$) does not sufficiently null identified jamming signals 103, the method 200 may proceed to step 218 in order to generate additional nullforming weight vectors ($W_{nf2}$, $W_{nf3}$, ..., $W_{nfn}$)

In this regard, the receiver 112 may extend baseline processing of method 200 to make nullforming more effective. In some embodiments, multiple unique nullforming reception patterns may be generated by changing only the seeding weight vector and the nullforming adjustment factor ($\eta_1$). The seeding weight vector can be a nulling weight vector ($W_{nul}$) readily available in AJ nulling, or a beamforming weight vector ($W_{bf}$) for any direction other than the direction for nullforming.

In a step 218, a second seeding weight vector ($W_{seed2}$) is calculated based on a second nulling constraint ($\tau_{o2}$) and/or a second beamforming constraint ($\tau_{xd2}$). As noted previously herein, the second seeding weight vector ($W_{seed1}$) may be set to a second nulling weight vector ($W_{nul2}$), based on a second nulling constraint ($\tau_{o2}$), or an additional beamforming weight vector ($W_{bf2}$), based on a second beamforming constraint ($\tau_{xd2}$) for a direction other than the nullforming direction. As noted previously herein, the second nulling constraint ($\tau_{o2}$) may include a column vector of M complex values, where M is the number of antenna elements within the antenna array 104. In practice, the nulling constraint vector ($\tau_{o2}$) may be set to all zeros with the exception of a single element that is set to 1. For example, the second nulling constraint vector may be set to $r_{o2}=[0\ 1\ 0 \ldots 0]^T$. The resulting second seeding weight vector ($W_{seed2}$) is managed by controller 108 and stored in memory 110.

In a step 220, a second nullforming weight vector ($W_{nf2}$) is determined. In embodiments, the second nullforming weight vector ($W_{nf2}$) may be calculated based on the beamforming weight vector ($W_{bf}$), the second seeding weight vector ($W_{seed2}$), and a second nullforming adjustment factor ($\eta_2$). For example, the signal processors 106 may be configured to calculate the second nullforming weight vector ($W_{nf2}$) as a function of a second seeding weight vector ($W_{seed2}$), the beamforming weight vector ($W_{bf}$) in the same direction as for nullforming, and a second nullforming adjustment factor ($\eta_2$), as shown in Equation 3:

$$W_{nf2} = W_{seed2} - \eta_2 W_{bf} \quad (3)$$

As noted previously herein, the second seeding weight vector ($W_{seed2}$) may be set to a second nulling weight vector ($W_{nul2}$) or a beamforming weight vector ($W_{bf2}$) for a direction other than the nullforming direction, as shown in Equation 4:

$$W_{seed2} = W_{nul2} \text{ or } W_{bf2} \quad (4)$$

In a step 222, the second nullforming weight vector ($W_{nf2}$) is applied to form a second AE output signal. For example, the one or more signal processors 106 may be configured to generate one or more control signals configured to apply the second nullforming weight vector ($W_{nf2}$) to the digitized output of the antenna array 104 in order to generate a second antenna pattern. In this regard, the signal processors 106 may be configured to form a second antenna pattern based on the second nullforming weight vector ($W_{nf2}$). The second antenna pattern may subsequently be used to modify the digitized signals of the antenna array 104 and generate the second AE output signal. In this regard, the second AE output may be regarded as the digitized signals from the antenna array 104 modified by the second antenna pattern, which was generated by the second nullforming weight vector ($W_{nf2}$).

In embodiments, the second antenna pattern generated by the second nullforming weight vector ($W_{nf2}$) may generate a second set of one or more nulls. The second set of one or more nulls may include one or more constrained nulls generated in a specified direction (e.g., direction of nullforming determined in step 208), one or more adaptive nulls generated in the direction of received jamming signals 103, and/or one or more sympathetic nulls generated in one or more directions other than the direction of the one or more received jamming signals 103 and/or the direction of the generated constrained nulls.

The second set of nulls may include one or more adaptive nulls generated in a direction of one or more received jamming signals 103. In some embodiments, the second set of nulls may be generated in different directions than the first set of nulls. In additional and/or alternative embodiments, the first and second sets of nulls may generate constrained nulls in the same direction. For example, the first set of one or more nulls include a first constrained null generated in a defined direction, and the second set of one or more nulls generate a second constrained null in the defined direction. It is noted herein that the second set of one or more nulls include one or more sympathetic nulls in directions other than those associated with jamming signals 103 and in directions different from the directions of the sympathetic nulls generated in the first set of one or more nulls. Furthermore, the signal processors 106 may be configured to generate the first set of nulls and the second set of nulls simultaneously or sequentially.

In a step 224, the receiver 112 may be configured to evaluate/process the second AE output signal. In this regard, the receiver 112 may be configured to evaluate the second AE output signal (e.g., digitized signals as modified by the second nullforming weight vector ($W_{nf2}$)/second antenna pattern).

In a step 216, the receiver 112 may be configured to evaluate/process the AE output signal. In this regard, the receiver 112 may be configured to evaluate the first AE output signal (e.g., digitized signals as modified by the first nullforming weight vector ($W_{nf1}$)/first antenna pattern).

By way of example, the receiver 112 may be configured to receive the second AE output signal (e.g., digitized signals of antenna array 104 modified by the second nullforming weight vector ($W_{nf2}$)/second antenna pattern), and determine a gain/power of the second AE output signal in the determined/constrained nulling direction. The receiver 112 may then be configured to determine a nulling effectiveness metric of the second nullforming weight vector ($W_{nf2}$) based on the determined gain/power of the second AE output signal. A nulling metric may include any metric indicative of an effectiveness of the constrained nulls of the second antenna pattern (e.g., second nullforming weight vector ($W_{nf2}$)) in suppressing and/or eliminating the intended signal 103b.

In additional and/or alternative embodiments, the receiver 112 may be configured to evaluate each of the first AE output signal and the second AE output signal, and compare the respective AE output signals. By evaluating and comparing the AE output signals, the receiver 112 may be configured to determine one or more characteristics of the signals 103, transmitting devices 101, and/or generated nulls. For example, the first nullforming weight vector ($W_{nf1}$) may generate a first set of one or more nulls in a first direction, and the second nullforming weight vector ($W_{nf2}$) may generate second set of one or more nulls in a second direction. Evaluation and comparison of the first AE output signal and the second AE output signal may reveal a first nulling effectiveness metric associated with the first nullforming weight vector ($W_{nf1}$) (e.g., first AE output signal), and a second nulling effectiveness metric associated with the second nullforming weight vector ($W_{nf2}$) (e.g., second AE output signal). In this example, the second nulling effectiveness metric may be greater than the first nulling effectiveness metric. By instantiating multiple nullforming operations as such, more robust and effective nullforming performance can be achieved. Accordingly, increased effectiveness of nullforming may enable the receiver 112 to more accurately identify a direction/angle of arrival of the jamming signals 103.

While method 200 is shown and described as generating/applying only a first nullforming weight vectors ($W_{nf1}$) and a second nullforming weight vectors ($W_{nf2}$), this is not to be regarded as a limitation of the present disclosure, unless noted otherwise herein. In this regard, steps 216-220 may be repeated any n number of times to generate n number of nullforming weight vectors ($W_{nfn}$). By repeating steps 216 to 220, the signal processors 106 and/or receiver 112 may further mitigate sympathetic nulls in the nullforming reception pattern, and make the constrained null more robust, thereby resulting in improved signal characterization and angle of arrival estimation.

As noted previously herein, the signal processors 106, controller 108, and/or receiver 112 provide processing functionality antenna system 100 and can include any number of processors, micro-controllers, circuitry, field programmable gate array (FPGA) or other processing systems, and resident or external memory for storing data, executable code, and other information accessed or generated by the antenna system 100. The signal processors 106, controller 108, and/or receiver 112 can execute one or more software programs embodied in a non-transitory computer readable medium (e.g., memory 110) that implement techniques described herein. The signal processors 106, controller 108, and/or receiver 112 are not limited by the materials from which it is formed or the processing mechanisms employed therein and, as such, can be implemented via semiconductor(s) and/or transistors (e.g., using electronic integrated circuit (IC) components), and so forth.

The memory 110 can be an example of tangible, computer-readable storage medium that provides storage functionality to store various data and/or program code associated with operation of the antenna array 104, signal processors 106, controller 108, and/or receiver 112 such as software programs and/or code segments, or other data to instruct the signal processors 106 and/or controller 108, and possibly other components of the antenna system 100, to perform the functionality described herein. Thus, the memory 110 can store data, such as a program of instructions for operating the antenna system 100, including its components (e.g., antenna array 104, signal processors 106, controller 108, receiver 112, etc.), and so forth. It should be noted that while a single memory 110 is described, a wide variety of types and combinations of memory (e.g., tangible, non-transitory memory) can be employed. The memory 110 can be integral with the signal processors 106, controller 108, and/or receiver 112, can comprise stand-alone memory, or can be a combination of both. Some examples of the memory 110 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An antenna system comprising:
an antenna array including two or more antenna elements, the antenna array configured to receive one or more signals; and
one or more signal processors configured to:
determine a beamforming weight vector ($W_{bf}$) for the antenna array;
determine a first seeding weight vector ( ) for the antenna array, wherein the first seeding weight vector ($W_{seed1}$) comprises at least one of a first nulling weight vector ($W_{null}$) or a first beamforming weight vector ($W_{bf1}$) different from the beamforming weight vector ($W_{bf}$);
determine a first nullforming adjustment factor ($\eta_1$) for the antenna array;
calculate a first nullforming weight vector ($W_{nf1}$) based on at least the beamforming weight vector ($W_{bf}$), the first seeding weight vector ($W_{seed1}$), and the first nullforming adjustment factor ($\eta_1$); and
form a first antenna pattern based on the first nullforming weight vector ($W_{nf1}$) to generate a first antenna electronics (AE) output signal, wherein the first antenna pattern generates a first set of one or more nulls, wherein the first set of one or more nulls include one or more adaptive nulls generated in a direction of one or more received jamming signals, the first set of one or more nulls further include one or more sympathetic nulls generated in one or more directions other than the direction of the one or more received jamming signals.

2. The antenna system of claim 1, wherein the first set of one or more nulls include one or more constrained nulls generated in a specified direction.

3. The antenna system of claim 1, wherein the first nullforming adjustment factor ($\eta_1$) is determined based on the beamforming weight vector ($W_{bf}$), a beamforming constraint for a determined nullforming direction ($\tau_{xd}$), and the first seeding weight vector ($W_{seed1}$).

4. The antenna system of claim 1, wherein the one or more signal processors comprise one or more digital signal processors.

5. The antenna system of claim 1, wherein the first nullforming weight vector ($W_{nf1}$) is defined as $W_{nf1} = W_{seed1} - \eta_1 W_{bf}$.

6. The antenna system of claim 1, further comprising a receiver configured to:
receive the first AE output signal;
determine power of the first AE output signal in a determined nulling direction; and
determine a nulling effectiveness metric of the first nullforming weight vector ($W_{nf1}$) based on the power of the first AE output signal.

7. The antenna system of claim 6, wherein the receiver is further configured to:
determine one or more characteristics of the one or more signals based on the first AE output signal, wherein the one or more characteristics of the one or more signals comprise a direction of the one or more signals.

8. The antenna system of claim 1, wherein the one or more signal processors are further configured to:
determine a second seeding weight vector ($W_{seed2}$) for the antenna array;
determine a second nullforming adjustment factor ($\eta_2$) for the antenna array;
calculate a second nullforming weight vector ($W_{nf2}$) based on at least the beamforming weight vector ($W_{bf}$), the second seeding weight vector ($W_{seed2}$), and the second nullforming adjustment factor ($\eta_2$); and
form a second antenna pattern based on the second nullforming weight vector ($W_{nf2}$) to generate a second AE output signal, wherein the second antenna pattern generates a second set of one or more nulls.

9. The antenna system of claim 8, wherein the first set of one or more nulls include a first constrained null generated in a defined direction, and the second set of one or more nulls generate a second constrained null in the defined direction.

10. The antenna system of claim 8, wherein the first set of one or more nulls and the second set of one or more nulls are generated simultaneously.

11. The antenna system of claim 8, further comprising a receiver configured to:
evaluate the first AE output signal;
evaluate the second AE output signal; and
compare the first AE output signal and the second AE output signal to determine one or more characteristics of the one or more signals.

12. The antenna system of claim 11, wherein evaluating the first AE output signal comprises determining a first nulling effectiveness of the first nullforming weight vector ($W_{nf1}$), and evaluating the second AE output signal comprises determining a second nulling effectiveness of the second nullforming weight vector ($W_{nf2}$).

13. An antenna system comprising:
an antenna array including two or more antenna elements, the antenna array configured to receive one or more signals; and
one or more signal processors configured to:
determine a beamforming weight vector ($W_{bf}$) for the antenna array;
determine a first seeding weight vector ( ) for the antenna array, wherein the first seeding weight vector ($W_{seed1}$) comprises at least one of a first nulling weight vector ($W_{null}$) or a first beamforming weight vector ($W_{bf1}$) different from the beamforming weight vector ($W_{bf}$);
determine a first nullforming adjustment factor ($\eta_1$) for the antenna array;
calculate a first nullforming weight vector ($W_{nf1}$) based on at least the beamforming weight vector ($W_{bf}$), the first seeding weight vector ($W_{seed1}$), and the first nullforming adjustment factor ($\eta_1$); and
form a first antenna pattern based on the first nullforming weight vector ($W_{nf1}$) to generate a first antenna electronics (AE) output signal, wherein the first antenna pattern generates a first set of one or more nulls, wherein the first nullforming adjustment factor ($\eta_1$) is determined based on the beamforming weight vector ($W_{bf}$), a beamforming constraint for a determined nullforming direction ($\tau_{xd}$), and the first seeding weight vector ($W_{seed1}$).

14. An antenna system comprising:
an antenna array including two or more antenna elements, the antenna array configured to receive one or more signals; and
one or more signal processors configured to:
determine a beamforming weight vector ($W_{bf}$) for the antenna array;
determine a first seeding weight vector ( ) for the antenna array, wherein the first seeding weight vector ($W_{seed1}$) comprises at least one of a first nulling weight vector ($W_{null1}$) or a first beamforming weight vector ($W_{bf1}$) different from the beamforming weight vector ($W_{bf}$);

determine a first nullforming adjustment factor ($\eta_1$) for the antenna array;

calculate a first nullforming weight vector ($W_{nf1}$) based on at least the beamforming weight vector ($W_{bf}$), the first seeding weight vector ($W_{seed1}$), and the first nullforming adjustment factor ($\eta_1$);

form a first antenna pattern based on the first nullforming weight vector ($W_{nf1}$) to generate a first antenna electronics (AE) output signal, wherein the first antenna pattern generates a first set of one or more nulls;

determine a second seeding weight vector $W_{seed2}$) for the antenna array;

determine a second nullforming adjustment factor ($\eta_2$) for the antenna array;

calculate a second nullforming weight vector ($W_{nf2}$) based on at least the beamforming weight vector ($W_{bf}$), the second seeding weight vector ($W_{seed2}$), and the second nullforming adjustment factor ($\eta_2$); and form a second antenna pattern based on the second nullforming weight vector ($W_{nf2}$) to generate a second AE output signal, wherein the second antenna pattern generates a second set of one or more nulls.

* * * * *